United States Patent [19]

Moran et al.

[11] 3,816,252

[45] June 11, 1974

[54] PROCESS FOR THE PRODUCTION OF MICRO-ORGANISMS

[75] Inventors: Francis Moran, Surrey, England; Philip Albert Myers, Rambouillet, France

[73] Assignee: The British Petroleum Company Limited, London, England

[22] Filed: Aug. 22, 1972

[21] Appl. No.: 282,691

[30] Foreign Application Priority Data
Aug. 24, 1971 Great Britain.................. 39599/71
Feb. 17, 1972 Great Britain..................... 7348/72

[52] U.S. Cl................. 195/28 R, 195/115, 195/117
[51] Int. Cl............................................ C12b 1/00
[58] Field of Search ...... 195/28 R; 99/9.14; 426/28, 426/53, 54, 364

[56] References Cited
UNITED STATES PATENTS
3,384,491  5/1968  Guenther et al. .......................... 99/9
3,489,648  1/1970  Wegner ............................. 195/28 R
3,649,459  3/1972  Wolnak et al. ....................... 195/96

Primary Examiner—Alvin E. Tanenholtz
Assistant Examiner—R. B. Penland
Attorney, Agent, or Firm—Morgan, Finnegan, Durham & Pine

[57] ABSTRACT

A continuous process for converting methane into proteinaceous materials wherein a methane utilising micro-organism, preferably Methylococcus casulatus is cultivated continuously under steady state conditions at a production rate of at least 0.81 (dry weight) of micro-organism per litre hour in an aqueous broth containing nutrient salts and ammonium ions, in the presence of methane and a gas containing free oxygen, adding an aqueous nutrient medium to the broth and maintaining the broth pH in the range 4.5 to 8.0 and the ammonium ion concentration in the range 2 to 100 milligrams per litre.

11 Claims, No Drawings

PROCESS FOR THE PRODUCTION OF MICRO-ORGANISMS

The present invention relates to a fermentation process for converting methane into proteinaceous materials. In particular the invention relates to a continuous process for the production of microorganisms using methane as a carbon substrate.

Processes for the production of micro-organisms have been described wehrein a methane utilising micro-organism is cultivated in an aqueous broth containing nutrient salts, in the presence of methane and a gas containing free oxygen. In such processes nitrates; ammonium salts, e.g. ammonium chloride or sulphate; or ammonia or ammonium hydroxide have been used as a nitrogen substrate.

We have found, in continuous processes, that the use of ammonium ions as a nitrogen substrate leads to a reduction in the growth rate of methane utilising micro-organisms which results finally in washout of the micro-organism unless the following special steps which we have devised are taken.

Accordingly the present invention is a continuous process for converting methane into proteinaceous materials which comprises cultivating a methane utilising micro-organism continuously under steady state conditions at a production rate of at least 0.81 grams (dry weight) of micro-organism per litre hour in an aqueous broth containing nutrient salts and ammonium ions, in the presence of methane and a gas containing free oxygen, wherein the broth pH is maintained in the range 4.5 to 8.0 and the ammonium ion concentration is maintained in the range 2 to 100 milligrams per litre.

The present process is based upon our discovery that, in continuous culture at high production rates, for example in the range 0.81 to 5.0 grams (dry weight) of micro-organisms per litre hour the maximum ammonium ion concentration which methane utilising micro-organisms can tolerate in the broth is about 100 milligrams per litre. We have found, in processes for the continuous culture of methane utilising micro-organism at given dilution rates, that the presence in the broth of ammonium ion concentrations above certain critical levels has the effect of depressing the specific growth rate sufficiently to cause "washout" of the culture.

Preferably the quantity of ammonium ions should not exceed 80 milligrams per litre and should be maintained in the range 2 tO 50 milligrams per litre. Below 2 mg/litre growth is considered to be limited by lack of ammonia nitrogen, but this value has not been precisely defined and is the limit of detection by the methods used for estimating ammonium ions. In operation of the process most of the ammonium ions added to the aqueous broth, preferably as ammonia or ammonium hydroxide, are utilized immediately by the micro-organisms. The remaining ammonium ions are then controlled within the required range. In practice the process is usually operated at an ammonium ion concentration of about 10 to 30 milligrams per litre.

The ammonium ion concentration in the broth can be estimated by sampling the broth at intervals followed by a quantitative chemical estimation of the ammonium ions. For example suitable colorimetric methods based on Nesslerisation are described by Paul J. (1958) in the Analyst, vol. 83, pp. 37–42 and Meynell, G. G. and Meynell, E. (1965) Theory and Practice in Experimental Bacteriology, Cambridge University Press. Alternatively a probe, preferably an "ammonia probe" in combination with a pH meter, can be used to estimate continuously or discontinuously the ammonium ion concentration in the broth. Such a probe and meter are manufactured by Electronic Instruments Ltd. of Great Britain.

Preferably the ammonium ions are derived by adding either ammonia or ammonium hydroxide to the broth.

Conveniently the process can be operated using either of the following techniques:

a. restricting the pH of the aqueous nutrient medium added to the broth and controlling the broth pH by adding ammonium ions in response to pH changes in the broth. The pH of the aqueous medium added to the broth is such that the resultant hydrogen ion concentration in the broth does not require the presence of more than 100 milligrams per litre of ammonium ions for pH control;

or b. maintaining an ammonium ion concentration in the broth in the range 2 to 100 milligrams per litre in response to means for estimating the concentration in the broth. The broth pH is controlled by addition of an alkali other than ammonia or ammonium hydroxide or by addition of an acid.

When ammonia or ammonium hydroxide is used as both the nitrogen substrate and as the only means for controlling the pH of the broth, in accordance with technique (a) defined above the aqueous nutrient medium added to the broth must have a pH of less than 7.5 and have a value which is sufficiently lower than the broth pH so that the resultant hydrogen ion concentration in the broth is such that the quantity of ammonium ions required at any given moment to control the broth pH does not exceed 100 milligrams per litre.

The pH of the aqueous medium will usually be in the range 1.0 to 7.5 and for most practical purposes will be in the range 2.0 to 3.5.

The aqueous medium can be selected from or based upon any known media used in methane fermentations from which part or all of the nitrogen source has been omitted. The quantity of each of the nutrients should be adjusted to ensure that the medium will support unrestricted growth of the micro-organism at the desired rate.

The natural pH of the medium will depend upon the composition of the nutrient salts and may be too high or too low for the present purpose, consequently an acid or an alkali may be required to adjust it to the desired pH. The pH of a medium containing sodium and or potassium phosphate salts as the source of phosphate may be too high and it will be necessary to add an acid, e.g. sulphuric or phosphoric acid. On the other hand the pH of a medium containing phosphoric acid as the source of phosphate may be too low and it may be necessary to add an alkali, e.g. sodium hydroxide. The pH value of the medium which is required depends on the cell density and on the pH at which it is desired to operate the fermentation. The cell density can depend, for example, on the oxygen transfer rate where oxygen is the limiting nutrient at a given dilution rate or methane transfer rate where methane is the limiting nutrient. The precise pH required can be determined empirically by simple experiments for each particular set of fermentation conditions.

Conveniently ammonia or ammonium hydroxide can be added to broth in response to an automatic titrator which comprises an electrode for measuring pH change in the broth and means for adding ammonia or ammonium hydroxide to the broth in response to such changes so as to maintain a desired fermentation pH.

The quantity of ammonia or ammonium hydroxide added in this way is equal to the sum of the quantity of ammonium ions required for unrestricted growth of the micro-organism and the quantity required to control the broth pH by neutralising the excess hydrogen ions derived from the aqueous medium added to the broth for nutritional purposes.

Where it is desired to use an aqueous nutrient medium without the foregoing pH restriction technique (b) can be used. The technique comprises maintaining the pH of the broth in the range 4.5 to 8.0 by addition of an acid or an alkali other than ammonia or ammonium hydroxide and maintaining the ammonium ion concentration of the broth in the range 2 to 100 milligrams per litre preferably by adding ammonia or ammonium hydroxide, in response to means for estimating the concentration of ammonium ions in the broth.

The ammonium ion concentration in the broth can be estimated in accordance with the methods previously described.

Ammonium hydroxide can be added to the medium or the broth, preferably by a pump, such as for example a conventional metering pump, the flow rate of the pump being adjusted either manually or automatically in response to the estimated ammonium ion concentration in the broth. Liquid or gaseous ammonia may be metered to the medium or broth by means of a conventional flow meter.

The alkali other than ammonia or ammonium hydroxide which is used to control the pH of the broth can be a hydroxide of an alkali metal, e.g., sodium hydroxide. Suitable acids are for example sulphuric or phosphoric acid.

The foregoing technique facilitates the use of a medium having any pH, however, a medium having a pH below 5.0 is preferred so as to maintain the mineral salts in solution.

Most suitably when operating the process in accordance with either of the foregoing techniques the upper limit for the broth pH is 7.5 and preferably lies in the ranges 5.0 to 7.0.

The operating temperature can be in the range 30° to 48°C. When Methylococcus capsulatus is used it is preferred to operate at a pH in the range 6.0 to 7.0 and at a temperature in the range of about 42° to about 48°C.

The process is normally operated under atmospheric pressures however over pressures of up to about 50 pounds per square inch gauge can be used.

Normally the proportion of gaseous components using air-methane mixtures should have an oxygen content of about 10 to 19 per cent and preferably about 16 to 18 per cent by volume, with a methane content of about 10 to 50 percent and preferably 15 to 25 percent by volume. The methane can be present in gases containing methane, e.g. natural gas. Oxygen enriched gases such as oxygen enriched air can be used.

The conditions under which the process can be carried out are selective for methane-utilising micro-organisms. It is not necessary to use aseptic fermentation techniques and, mainly for economic reasons, non-aseptic operation is preferred.

The micro-organisms can be separated from the cultivated broth by such known techniques as centrifugation and/or filtration which may be combined with a flocculation step.

The methane utilising micro-organisms can be obtained by using any of the known isolation techniques for this type of micro-organism. Suitable techniques are described by Sheehan and Johnson in "Applied Microbiology" Vol. 21, No. 3, 1971 pp. 511–515 or by Whittenbury in the Journal of General Microbiology, 1970, Vol. 61 pp. 205–218. *Methylococcus capsulatus* is the preferred bacterium. Enrichment techniques are a particularly convenient way of obtaining microbial populations containing methane utilising micro-organisms for use in the process.

The present invention is illustrated but not limited with reference to the following examples:

EXAMPLE 1

Stage A: Method for obtaining a culture of methane-utilising bacteria for use in the process.

500 millimetre slurries of methane-containing mud from stagnant pools were added at daily intervals for 5 days to an aerated stirred fermenter which had a working volume of 3.0 litres and contained 3.0 litres of an aqueous medium having the following composition:

| | | |
|---|---|---|
| $KH_2PO_4$ | 1600.0 | milligrams per litre |
| $Na_2HPO_4, 12 H_2O$ | 2928.0 | do. |
| $NaNO_3$ | 1180.0 | do. |
| $MgSO_4 \cdot 7H_2O$ | 80.0 | do. |
| $FeSO_4 \cdot 7H_2O$ | 14.0 | do. |
| $Ca(NO_3)_2 \cdot 4H_2O$ | 25.0 | do. |
| $CuSO_4 \cdot 5H_2O$ | 4.0 | do. |
| $ZnSO_4 \cdot 7H_2O$ | 0.34 | do. |
| $MnSO_4 \cdot H_2O$ | 0.30 | do. |
| $Na_2MoO_4 \cdot 2H_2O$ | 0.24 | do. |
| Demineralised water | | to 1000 millimeters |
| pH | 6.2 | |

The fermenter was maintained at a temperature of 45°C, a dilution rate of 0.084 per hour and an impeller speed of 1000 revolutions per minute.

The pH was maintained at 6.7 by the addition of 0.5 N sodium hydroxide as required. A gas mixture consisting of 33 percent by volume of methane; 64 percent by volume of air and 3 percent by volume of carbon dioxide was applied to the fermenter inlet at a flow rate of 20 volumes/volume hour.

A methane utilising bacterial population was allowed to develop naturally under these selective conditions.

After 7 days of operation using this medium under the foregoing conditions the bacterial population reached a cell density of 1.0 gram dry weight/litre and had the following composition. Only one methane utilising strain of bacterium could be isolated from this population. The other types of bacteria were not able to utilise methane. The proportion of methane utilising bacteria to the other types of bacteria was about 90 to 95 percent by number. The methane utilising bacterium was a coccus having a diameter of about 1.1 to 1.4 $\mu$m. It was capsule-forming and capable of utilising both methane and methanol but not glucose. On solid medium made up by adding 1.0 percent w/v of agar to the fermentation medium described initially, after incubation for 3–4 days at 45°C under an atmosphere of methane-air (50—50 volume), the colonies had the following morphology. The diameter was about 1-2 millimetres, and the appearance was white, smooth and rounded. These characteristics agree in all respects with those of a strain of *Methylococcus capsulatus* as described by J. W. Foster and R. H. Davis (1966) Journal of Bacteriology, Vol. 91, p. 1924 and by R. Whittenbury, K. C. Phillips and J. F. Wilkinson (1970), Journal of General Microbiology, Vol. 61, p. 205.

Stage B: Intermediate stage to build up the cell density for steady state operation 3.0 litres of culture broth containing the methane utilising bacterial population obtained in accordance with stage A, was used to start a continuously operated stirred fermenter having a working volume of 3.0 litres. An aqueous medium having the following composition was fed continuously to the fermenter:

| | | |
|---|---|---|
| $KH_2PO_4$ | 335.0 | milligrams per litre |
| $Na_2HPO_4 \cdot 12H_2O$ | 277.5 | do. |
| $NaNO_3$ | 1193.8 | do. |
| $MgSO_4 \cdot 7H_2O$ | 160.0 | do. |
| $Ca(NO_3)_2 \cdot 4H_2O$ | 90.0 | do. |
| $CuSO_4 \cdot 5H_2O$ | 4.6 | do. |
| $FeSO_4 \cdot 7H_2O$ | 14.5 | do. |
| $ZnSO_4 \cdot 7H_2O$ | 0.6 | do. |
| $MnSO_4 \cdot H_2O$ | 0.8 | do. |
| $CoCl_2 \cdot 6H_2O$ | 0.03 | do. |
| $Na_2MoO_4 \cdot 2H_2O$ | 0.3 | do. |
| $H_2SO_4$ (36 N) | 0.34 | millimeters per litre |
| $HNO_3$ (13.6 N) | 3.1 | do. |
| Demineralised water | | to 1000 millilitres |
| pH | 1.3 | |

The fermenter was maintained at a temperature of 45°C, a dilution rate of 0.18 and an impeller speed of 1,500 revolutions per minute. A gas flow rate of 30 volumes/volume hour was applied to the fermenter. The gas consisted of 20 percent by volume of methane and 80 percent by volume of air. After an initial few minutes where the pH was controlled with 1.0 N NaOH the pH was thereafter controlled at 6.0 by the addition of 1.0 N $H_2SO_4$ or 1.0 N NaOH as required from an automatic titrator. The fermentation was operated until the cell density rose to about 5.0 grams (dry wt) per litre. The medium was then changed to the following:

| | | |
|---|---|---|
| $H_3PO_4$ | 722.5 | milligrams per litre |
| $MgSO_4 \cdot 7H_2O$ | 375.0 | do. |
| KCl | 250.0 | do. |
| $FeSO_4 \cdot 7H_2O$ | 37.5 | do. |
| $CaCl_2$ | 75.0 | do. |
| $CuSO_4 \cdot 5H_2O$ | 15.0 | do. |
| $ZnSO_4 \cdot 7H_2O$ | 2.25 | do. |
| $MnSO_4 \cdot H_2O$ | 0.75 | do. |
| $Na_2MoO_4 \cdot 2H_2O$ | 1.0 | do. |
| $CoCl_2 \cdot 6H_2O$ | 0.35 | do. |
| NaOH | 250.0 | do. |
| Demineralised water | | to 1000 millilitres |
| pH | 3.0 | |

Stage C: Steady state operation using ammonium hydroxide as both a nitrogen source and to control the pH of the broth The pH was controlled at 6.0 by the addition of 1.1 N ammonium hydroxide from an automatic titrator in response to pH changes in the broth. The fermentation was operated under steady state conditions for a minimum period of 7 days. The cell density under these conditions stabilised at about 5.0 grams per litre giving a bacterial cell production rate of about 0.9 grams (dry weight) per litre hour. The yield factor on methane, i.e. weight of cells produced (dry weight) per unit weight of methane consumed in the fermentation was 0.66. The yield factor on oxygen was 0.21.

The following results are typical of those obtained during the experiment:

| Time | Medium input | Cell density | Excess $NH_4^+$ concn. in broth |
|---|---|---|---|
| (hours) | (ml/hour) | (grams/l) | (mg/litre) |
| 0 | 510 | 4.9 | 16.2 |
| 12 | do. | 5.1 | 7.5 |
| 24 | do. | 4.9 | 12.3 |
| 36 | do. | 5.0 | 10.9 |
| 48 | do. | 5.2 | 9.2 |
| 60 | do. | 5.1 | 20.3 |
| 72 | do. | 4.9 | 31.7 |
| 84 | do. | 5.0 | 25.5 |
| 96 | do. | 5.0 | 18.4 |

The excess ammonium ion concentration was estimated in 10 ml samples of broth using a colorimetric technique.

The above results demonstrate that by using a medium having a precise pH value designed specifically for a fermentation under precise steady state conditions, the excess acidity in the fermentation broth is limited to a level which demands only very limited neutralization by ammonium hydroxide. This amount of ammonium hydroxide gives rise to an excess ammonium ion concentration in the broth which is normally between 7.5 and 31.7 milligrams per litre. The bulk of the ammonium hydroxide added to the fermentation was immediately utilized as a source of nitrogen for growth of the methane-utilizing bacterial culture.

EXAMPLE 2

3.0 litres of culture broth containing the methane utilising bacterial population obtained in accordance with the isolation and cell density build up stages A and B of Example 1 were used to start a continuously operated production fermenter having a working volume of 3.0 litres. An aqueous medium having the following composition was fed continuously to the fermenter:

| | | |
|---|---|---|
| $KH_2PO_4$ | 335.0 | milligrams per litre |
| $Na_2HPO_4 12H_2O$ | 277.5 | do. |
| $MgSO_4 7H_2O$ | 200.0 | do. |
| $CaCl_2$ | 50.0 | do. |
| $NaSO_4$ (anhydrous) | 500.0 | do. |
| $ZnSO_4 7H_2O$ | 5.0 | do. |
| $CuSO_4 5H_2O$ | 2.0 | do. |
| $MnSO_4 H_2O$ | 0.2 | do. |
| $NaMoO_4 2H_2O$ | 3.0 | do. |
| $CoCl_2 6H_2O$ | 0.01 | do. |
| $FeSO_4 7H_2O$ | 5.0 | do. |
| $H_2SO_4$ | 2.3 | milliequivalents per litre |
| Demineralized water to make up one liter | | |
| pH | 3.1 | |

Stage C: Steady state operation using ammonium hydroxide as both a nitrogen source and to control the pH of the broth The fermenter was maintained at a temperature of 45°C, a dilution rate of 0.18 and an impeller speed of 1500 revolutions per minute. A gas flow rate of 30 volumes per volume/hour was applied to the fermenter. The gas consisted of 20 percent by volume of methane and 80 percent by volume of air.

The pH was controlled at 6.0 by the addition of 1.1 N ammonium hydroxide as required. The fermentation was operated under steady state conditions for 7 days.

The cell density under these conditions was 4.5 grams per litre with a bacterial cell production rate of 0.81 grams (dry weight) per litre hour. The yield factor on methane, i.e. weight Of cells produced (dry weight) per unit of methane supplied to the fermenter was 0.66.

The yield factor on oxygen was 0.21.

By adding to the broth an aqueous nutrient medium having a pH of 3.1 and containing 2.3 milliequivalents per litre of sulphuric acid at a dilution rate of 0.18 per hour the resultant hydrogen ion concentration in the aqueous phase was such that the quantity of ammonium ions required in the aqueous phase at any given moment to control the pH at 6 under steady state continuous operation varied in the range 5.0 to 50 milligrams per litre. The ammonium hydroxide was used both as the source of nitrogen and as the means of controlling the broth pH.

EXAMPLE 3

Stage B: Intermediate stage to build up the cell density for steady state operation 5.0 litres of culture broth containing tHe methane utilising bacterial population obtained in accordance with Stage A of Example 1, was used to start a continuously operated stirred fermenter having a working volume of 5.0 litres. An aqueous medium having the following composition was fed continuously to the fermenter:

| | | |
|---|---|---|
| $KH_2PO_4$ | 782.0 | milligrams per litre |
| $Na_2HPO_4 \cdot 12H_2O$ | 647.5 | do. |
| $NaNO_3$ | 2785.5 | do. |
| $MgSO_4 \cdot 7H_2O$ | 373.0 | do. |
| $Ca(NO_3)_2 \cdot 4H_2O$ | 210.0 | do. |
| $CuSO_4 \cdot 5H_2O$ | 10.6 | do. |
| $FeSO_4 \cdot 7H_2O$ | 33.8 | do. |
| $ZnSO_4 \cdot 7H_2O$ | 1.3 | do. |
| $MnSO_4 \cdot H_2O$ | 1.8 | milligrams per litre |
| $CoCl_2 \cdot 6H_2O$ | 0.06 | do. |
| $Na_2MoO_4 \cdot 2H_2O$ | 0.75 | do. |
| $H_2SO_4$ (36 N) | 0.8 | millilitres per litre |
| $HNO_3$ (13.6 N) | 7.3 | do. |
| Demineralised water | | to 1000 millilitres |
| pH | 1.3 | |

The fermenter was operated at a temperature of 45°C, a dilution rate of 0.18 h$^{-1}$ and an impeller speed of 3,000 revolutions per minute. A gas flow rate of 66 volumes per volume hour was applied to the fermenter inlet. The gas consisted of 18.2 percent by volume of methane, and 81.8 percent by volume of air. The pH was adjusted to 6.1 and thereafter controlled at 6.1 by the addition of 1.0 N $H_2SO_4$ or 1.0 N NaOH solution as required from an automatic titrator.

Under these conditions the cell density gradually increased to about 14 grams (dry wt) per litre. At this stage, the medium was chanbed to changed following:

| | | |
|---|---|---|
| $KH_2PO_4$ | 937.5 | milligrams per litre |
| $Na_2HPO_4 \cdot 12H_2O$ | 787.5 | do. |
| $MgSO_4 \cdot 7H_2O$ | 562.5 | do. |
| $FeSO_4 \cdot 7H_2O$ | 50.6 | do. |
| $CaCl_2$ | 112.5 | do. |
| $CuSO_4 \cdot 5H_2O$ | 20.5 | do. |
| $ZnSO_4 \cdot 7H_2O$ | 2.5 | do. |
| $MnSO_4 \cdot H_2O$ | 1.7 | do. |
| $Na_2MoO_4 \cdot 2H_2O$ | 1.5 | do. |
| $CoCl_2 \cdot 6H_2O$ | 0.5 | do. |
| $Na_2SO_4$ | 225.0 | do. |
| $H_2SO_4$ (36 N) | 0.2 | millilitres per litre |
| Demineralized water | | to 1000 millilitres |
| pH | 2.6 | |

Stage C: Steady state operation using ammonium hydroxide as both a nitrogen source and to control the pH of the broth The pH of the fermentation broth was controlled at 6.1 by the addition of 1.1 N $NH_4OH$ solution from an automatic titrator in response to pH changes in the broth. The ammonium hydroxide served as both nitrogen source for growth and neutralizing agent.

The cell density under these conditions stabilised at about 14 grams dry weight per litre. The fermentation was operated under steady state conditions for a minimum period of 7 days. The bacterial production rate was about 2.5 grams dry weight cells produced per litre hour. The excess ammonium ion concentration in the broth was estimated in accordance with the technique described in Example 2.

The following results are typical of these obtained during the experiment:

| Time | Medium input | Cell density | Excess $NH_4^+$ conc. in broth |
|---|---|---|---|
| (hours) | (ml/hour) | (g/litre) | (mg/litre) |
| 0 | 820 | 14.1 | 14.4 |
| 12 | do. | 14.0 | 11.5 |
| 24 | do. | 14.1 | 9.2 |
| 36 | do. | 14.0 | 10.4 |
| 48 | do. | 14.0 | 18.3 |
| 60 | do. | 14.1 | 17.6 |
| 72 | do. | 14.2 | 20.4 |
| 84 | do. | 14.1 | 21.2 |
| 96 | do. | 14.0 | 18.5 |

EXAMPLE 4

Stage B: Intermediate stage to build up cell density for steady state operation 5.0 litres of culture broth containing the methane assimilating bacterial population obtained in accordance with Stage A of Example 1, was used to start a continuously operated stirred fermenter having a working volume of 5.0 litres. An aqueous medium having the following composition was fed continuously to the fermenter:

| | | |
|---|---|---|
| $KH_2PO_4$ | 782.5 | milligrams per litre |
| $Na_2HPO_4 \cdot 12H_2O$ | 647.5 | do. |
| $NaNO_3$ | 2785.5 | do. |
| $MgSO_4 \cdot 7H_2O$ | 373.0 | do. |
| $Ca(NO_3)_2 \cdot 4H_2O$ | 210.0 | do. |
| $CuSO_4 \cdot 5H_2O$ | 10.6 | do. |
| $FeSO_4 \cdot 7H_2O$ | 33.8 | do. |
| $ZnSO_4 \cdot 7H_2O$ | 1.3 | do. |
| $MnSO_4 \cdot H_2O$ | 1.8 | do. |
| $CoCl_2 \cdot 6H_2O$ | 0.06 | do. |
| $Na_2MoO_4 \cdot 2H_2O$ | 0.75 | do. |
| $H_2SO_4$ (36 N) | 0.8 | millilitres per litre |
| $HNO_3$ (13.6 N) | 7.3 | do. |
| Demineralized water | | to 1000 millilitres |
| pH | 1.3 | |

The fermenter was operated at a temperature of 45°C, a dilution rate of 0.10h$^{-1}$ and an impeller speed of 3,000 revolutions per minute. A gas flow rate of 66 volumes per volume hour was applied to the fermenter inlet. The gas consisted of 18.2 percent by volume of methane, and 81.8 percent by volume of air. The pH was adjusted to 6.1 and thereafter controlled at 6.1 by the addition of 1.0 N $H_2SO_4$ or 1.0 N NaOH solution (as required) from an automatic titrator.

Under these conditions, the cell density gradually rose to about 25 grams (dry wt) per litre. At this stage the medium was changed to the following:

| | | |
|---|---|---|
| $KH_2PO_4$ | 1875.0 | milligrams per litre |
| $Na_2HPO_4 \cdot 12H_2O$ | 1575.0 | do. |
| $MgSO_4 \cdot 7H_2O$ | 1125.0 | do. |
| $FeSO_4 \cdot 7H_2O$ | 101.4 | do. |
| $CaCl_2$ | 225.0 | do. |
| $CuSO_4 \cdot 5H_2O$ | 41.0 | do. |
| $ZnSO_4 \cdot 7H_2O$ | 5.0 | do. |
| $MnSO_4 \cdot H_2O$ | 3.4 | do. |
| $Na_2MoO_4 \cdot 2H_2O$ | 2.9 | do. |
| $CoCl_2 \cdot 6H_2O$ | 1.0 | do. |
| $Na_2SO_4$ | 450.0 | do. |
| $H_2SO_4$ (36 N) | 0.4 | millilitres per litre |
| Demineralized water | | to 1000 millilitres |
| pH | 2.3 | |

Stage C: Steady state operation using ammonium hydroxide as both a nitrogen source and to control the pH of the broth The pH of the fermentation broth was controlled at 6.1 by the addition of 1.1 N $NH_4OH$ solution from an automatic titrator in response to pH changes in the broth. The ammonium hydroxide served as both nitrogen source for growth and neutralizing agent.

The cell density under these conditions stabilised at about 25.0 grams (dry weight) per litre. The fermentation was operated under steady state conditions for a minimum period of 7 days. The bacterial production rate was about 2.5 grams (dry weight) cells produced per litre hour. The excess ammonium ion concentration in the broth was estimated by a colorimetric technique.

The following results are typical of those obtained during the experiments:

| Time | Medium input | Cell density | Excess $NH_4^+$ concn. in broth |
|---|---|---|---|
| (hours) | (ml/hour) | (g/litre) | (mg/litre) |
| 0 | 415 | 25.0 | 21.6 |
| 12 | do. | 25.0 | 22.0 |
| 24 | do. | 24.5 | 18.0 |
| 36 | do. | 25.0 | 19.5 |
| 48 | do. | 25.5 | 17.2 |
| 60 | do. | 25.0 | 22.0 |
| 72 | do. | 24.5 | 25.0 |
| 84 | do. | 24.5 | 30.2 |
| 96 | do. | 25.0 | 30.0 |

EXAMPLE 5

Stage A: Method for obtaining a culture of methane utilising bacteria for use in the process 500 millilitre slurries of methane containing mud from stagnant pools were added at daily intervals for 5 days to an aerated stirred fermenter. The fermenter had a working volume of 5.0 litres and contained 5.0 litres of an aqueous medium having the following composition:

| | | |
|---|---|---|
| $KH_2PO_4$ | 1600.0 | milligrams per litre |
| $Na_2HPO_4 \cdot 12H_2O$ | 2928.0 | do. |
| $NaNO_3$ | 1180.0 | do. |
| $MgSO_4 \cdot 7H_2O$ | 80.0 | do. |
| $FeSO_4 \cdot 7H_2O$ | 14.0 | do. |
| $Ca(NO_3)_2 \cdot 4H_2O$ | 25.0 | do. |
| $CuSO_4 \cdot 5H_2O$ | 4.0 | do. |
| $ZnSO_4 \cdot 7H_2O$ | 0.34 | do. |
| $MnSO_4 \cdot H_2O$ | 0.30 | milligrams per litre |
| $Na_2MoO_4 \cdot 2H_2O$ | 0.24 | do. |
| Demineralised water to make up one litre | | |
| pH | 6.25 | |

The fermenter was maintained at a temperature of 45°C, a dilution rate of 0.084 per hour and an impeller speed of 1,000 revolutions per minute.

The pH was maintained at 6.75 by the addition of 0.5 N sodium hydroxide as required. A gas mixture consisting of 33 percent by volume of methane; 64 percent by volume of air and 3 percent by volume of carbon dioxide was applied to the fermenter inlet at a flow rate of 20 volume/volume hour.

A methane utilising bacterial population was allowed to develop naturally under these selective conditions.

After 7 days of operation using this medium under the foregoing conditions the bacterial population reached a cell density of 1.10 g (dry weight) litre and had the following composition. Only one methane utilising strain of bacterium could be isolated from this population. The other types of bacteria were not able to utilise methane. The proportion of methane utilising bacteria to the other types of bacteria was about 90 to 95 percent by number. The methane utilising bacterium was a coccus having a diameter of about 1.1 to 1.4 microns. It was capsule forming and capable of utilising both methane and methanol but not glucose. On solid medium made up by adding 1.0% w/v of agar to the fermentation medium described initially, after incubation for 3–4 days at 45°C under an atmosphere of methane-air (50—50 volume), the colonies had the following morphology. The diameter was about 1-2 millimetres, and the appearance was white, smooth and rounded. These characteristics agree in all respects with those of a strain of Methylococcus capsulatus as described by J. W. Foster and R. H. Davis (1955) J. BACT. Vol. 91, 1924 and R. Whittenbury, K. C. Phillips and J. F. Wilkinson (1970) J. Gen. Microbiology, Vol. 61.205.

Stage B: Intermediate stage to build up the cell density for steady state operation The 5.0 litres of culture broth containing the methane-utilising bacterial population obtained in the foregoing manner was used to start a continuously operated production fermenter having a working volume of 5.0 litres. An aqueous medium having the following composition was fed continuously to the fermenter:

| | | |
|---|---|---|
| $KH_2PO_4$ | 937.5 | milligrams per litre |
| $Na_2HPO_4 \cdot 12H_2O$ | 787.5 | do. |
| $MgSO_4 \cdot 7H_2O$ | 562.5 | do. |
| $H_2SO_4$ | 706.0 | do. |
| $CaCl_2$ (anhydrous) | 112.5 | do. |
| $FeSO_4 \cdot 7H_2O$ | 42.7 | do. |
| $Na_2SO_4$ (anhydrous) | 225.0 | do. |
| $CuSO_4 \cdot 5H_2O$ | 20.5 | do. |
| $ZnSO_4 \cdot 7H_2O$ | 2.5 | do. |
| $Na_2MoO_4 \cdot 2H_2O$ | 1.5 | do. |
| $MnSO_4 \cdot H_2O$ | 1.7 | do. |
| $CoCl_2 \cdot 6H_2O$ | 0.5 | do. |
| Water | | to 1 litre |
| pH about | 2.6 | |

The fermenter was operated at a temperature of 45°C, a dilution rate of 0.18 and an impeller speed of 3,000 revolutions per minute. A gas flow rate of 66 volumes/volume hour was applied to the fermenter inlet. The gas consisted of 18.2 percent by volume of methane and 81.8 percent by volume of air. The pH was adjusted to 6.5 using NaOH and thereafter controlled at 6.5 by the addition of 1.0 N NaOH as required in response to an automatic titrator.

The nitrogen was supplied as ammonium hydroxide (1.1 N) which was pumped into the fermenter at a gradually increasing rate to build up a cell density of about 14 grams dry weight. The "excess" ammonium ion concentration in the cultivated broth was estimated by sampling 10 mls of broth every 10 minutes and then increasing the ammonium ion concentration using the colorimetric technique described by Paul J. in the Analyst, 1958. Vol. 83, p. 37–42 (or Maynell, GG and Meynell, E. (1965) Theory and Practice of Experimental Bacteriology, Cambridge University Press. Alternatively the ammonium ion concentration can be estimated by an "ammonia probe" in combination with a pH meter such as the probe supplied by Electronic Instruments Ltd. (EIL) of Great Britain as Laboratory Model 8002-2 in combination with an EIL pH meter Model 7030. The "excess" of ammonium ions in the broth was maintained at a concentration of 5 to 10 milligrams per litre by manually controlling the rate at which the ammonium hydroxide was pumped into the fermenter.

Stage C: Steady state operation using ammonium hydroxide as the nitrogen source with an independent pH control using sodium hydroxide When the cell density of the fermenter in stage B has reached 13.5 gms/litre steady state operation was commenced using the same fermentation conditions as described for stage B. The ammonium ion "excess" was maintained at a concentration of between 5 and 10 milligrams per litre using one of the techniques previously described. At this stage the rate at which the ammonium hydroxide was pumped into the fermenter was with the exception of small adjustments practically constant.

The fermentation was operated under steady state conditions for 17 days. The cell density under the foregoing conditions was 13.5 grams per litre with a bacterial cell production rate of 13.5 × 0.18 grams (dry weight) per litre hour. The yield factor on methane, i.e. weight of cells produced (dry weight) per unit of weight of methane supplied to the fermenter was 0.63. The yield factor on oxygen was 0.23.

EXAMPLE 6

Stage B: Intermediate stage to build up the cell density for steady state operation 3.0 litres of culture broth containing the methane utilising bacterial population obtained in accordance with stage A of Example 1 was used to start a continuously operated stirred fermenter having a working volume of 3.0 litres. An aqueous medium having the following composition was fed continuously to the fermenter:

| | | |
|---|---|---|
| $KH_2PO_4$ | 335.0 | milligrams per litre |
| $Na_2HPO_4 \cdot 12H_2O$ | 277.5 | do. |
| $MgSO_4 \cdot 7H_2O$ | 160.0 | do. |
| $FeSO_4 \cdot 7H_2O$ | 14.5 | do. |
| $CaCl_2$ | 40.0 | do. |
| $CuSO_4 \cdot 5H_2O$ | 4.55 | do. |
| $ZnSO_4 \cdot 7H_2O$ | 0.55 | do. |
| $MnSO_4 \cdot H_2O$ | 0.75 | do. |
| $Na_2MoO_4 \cdot 2H_2O$ | 0.32 | do. |
| $CoCl_2 \cdot 6H_2O$ | 0.023 | do. |
| $H_2SO_4$ (36 N) | 0.125 | millilitres per litre |
| Demineralised water | | to 1000 millilitres |
| pH | 2.6 | |

The fermenter was maintained at a temperature of 45°C, a dilution rate of 0.18 and an impeller speed of 1,500 revolutions per minute. A gas flow rate of 30 volumes/volume hour was applied to the fermenter. The gas consisted of 20 percent by volume of methane and 80 percent by volume of air.

Stage C: Steady state operation using ammonium hydroxide as the nitrogen source with an independent pH control using sodium hydroxide The pH was controlled at 6.6 by the addition of 1.0 N sodium hydroxide from an automatic titrator in response to pH changes in the broth. A 1.1 N ammonium hydroxide solution was added by a pump, the input rate adjusted according to the estimated ammonium ion concentration in the broth. The ammonium ion concentration was estimated by a colorimetric method referred to in stage B of Example 5. The fermentation was operated for a minimum period of 7 days. The cell density under these conditions was about 5.0 grams per litre giving a bacterial cell production rate of about 0.9 grams (dry wt) per litre hour.

The following results are typical of these obtained during the experiment:

| Time (hours) | Medium input (ml/h) | Uptake of 1.0 N NaOH by titration (ml/h) | Cell density (g/l) | Excess $NH_4^+$ concn. in broth (mg/l) |
|---|---|---|---|---|
| 0 | 500 | 3.0 | 4.9 | 15.0 |
| 12 | do. | 3.0 | 5.0 | 8.0 |
| 24 | do. | 2.9 | 5.0 | 7.5 |
| 36 | do. | 3.0 | 4.9 | 10.0 |
| 48 | do. | 3.1 | 4.9 | 12.5 |
| 60 | do. | 2.9 | 5.0 | 15.0 |
| 72 | do. | 3.0 | 5.0 | 17.5 |
| 84 | do. | 3.0 | 4.8 | 16.0 |
| 96 | do. | 2.9 | 5.0 | 15.0 |

The above results demonstrate that by supplying ammonium hydroxide by a pump in response to the excess $NH_4^+$ ion concentration in the broth, a steady-state fermentation can be operated. Neutralization by sodium hydroxide maintains a constant pH in the fermentation broth.

EXAMPLE 7

Stage B: Intermediate stage to build up the cell density 5.0 litres of culture broth containing the methane utilising bacterial population obtained in accordance with stage A of Example 1, was used to start a continuously operated stirred fermenter having a working volume of 5.0 litres. An aqueous medium having the following composition was fed continuously to the fermenter:

| | | |
|---|---|---|
| $H_3PO_4$ | 1098.0 | milligrams per litre |
| $MgSO_4 \cdot 7H_2O$ | 825.0 | do. |
| KCl | 275.0 | do. |
| $Na_2SO_4$ | 210.0 | do. |
| $FeSO_4 \cdot 7H_2O$ | 54.4 | do. |
| $CaCl_2$ | 75.0 | do. |
| $CuSO_4 \cdot 5H_2O$ | 20.6 | do. |
| $ZnSO_4 \cdot 7H_2O$ | 2.9 | do. |
| $MnSO_4 \cdot H_2O$ | 0.8 | do. |
| $Na_2MoO_4 \cdot 2H_2O$ | 1.5 | do. |
| $CoCl_2 \cdot 6H_2O$ | 0.5 | do. |
| Demineralised water | | to 1000 millilitres |
| pH | 2.25 | |

The fermenter was operated at a temperature of 45°C, a dilution rate of 0.18 $h^{-1}$ and an impeller speed of 3,000 revolutions per minute. A gas flow rate of 66 volumes per volume hour was applied to the fermenter inlet. The gas consisted of 18.2 percent by volume of methane and 81.8 percent by volume of air.

A 1.1 N solution of ammonium hydroxide was added to the fermenter broth by a pump, the input rate being regulated according to the ammonium ion concentration in the broth using the estimation technique given in Example 5. The pH was controlled at 6.2 by the addition of 1.0 N NaOH solution from an automatic titrator in response to pH changes in the broth.

Stage C: Steady state operation using ammonium hydroxide as the nitrogen source with an independent pH control using sodium hydroxide The cell density under these conditions stabilised at about 14 grams (dry weight) per litre. The fermentation was operated under steady state conditions for a minimum period of 7 days. The bacterial production rate was about 2.5 grams (dry wt) per litre hour.

The following results are typical of those obtained during the experiment:

| Time | Medium input | Uptake of 1.0 N NaOH by titration | Cell density | Excess $NH_4^+$ concn. in broth |
|---|---|---|---|---|
| (hours) | (ml/h) | (ml/h) | (g/l) | (mg/l) |
| 0 | 815 | 5.3 | 13.9 | 15.0 |
| 12 | do. | 5.5 | 14.0 | 12.5 |
| 24 | do. | 5.7 | 14.3 | 10.0 |
| 36 | do. | 5.8 | 14.4 | 9.5 |
| 48 | do. | 5.5 | 14.0 | 10.0 |
| 60 | do. | 5.7 | 14.1 | 8.0 |
| 72 | do. | 5.1 | 14.3 | 7.5 |
| 84 | do. | 5.6 | 14.0 | 7.8 |
| 96 | do. | 5.7 | 14.4 | 9.5 |

We claim:

1. A continuous process for converting methane into proteinaceous materials which comprises cultivating a methane utilising micro-organism continuously under steady state conditions at a minimum production rate of 0.81 grams (dry weight) of microorganism per litre hour in an aqueous broth containing nutrient salts and ammonium ions in the presence of methane and a gas containing free oxygen, adding an aqueous nutrient medium to the broth and maintaining the broth pH in the range 4.5 to 8.0 and the ammonium ion concentration in the range of 2 to 100 milligrams per litre.

2. A process as claimed in claim 1 wherein the pH of the aqueous nutrient medium added to the broth is in the range 1.0 to 7.5 and has a value which is sufficiently lower than the broth pH so that the resultant hydrogen ion concentration in the broth is such that the quantity of ammonium ions required at any given moment to control the broth pH is in the range 2 to 100 milligrams per litre.

3. A process as claimed in claim 2 wherein the pH of the aqueous medium is in the range 2.0 to 3.5.

4. A process as claimed in claim 1 wherein the broth pH is maintained in the range 4.5 to 8.0 by addition of an acid selected from the group consisting of sulfuric and phosphoric acids or a hydroxide of an alkali metal and the ammonium ion concentration is maintained in the range 2 to 100 milligrams per litre in response to means for estimating the ammonium ion concentration in the broth.

5. A process as claimed in claim 1 wherein the ammonium ions are derived by adding either ammonia or ammonium hydroxide to the broth.

6. A process as claimed in claim 1 wherein the ammonium ion concentration is maintained in the range 2 to 50 milligrams per litre.

7. A process as claimed in claim 1 wherein the ammonium ion concentration is maintained in the range 10 to 30 milligrams per litre.

8. A process as claimed in claim 1 wherein the methane utilising micro-organism is part of a microbial population obtained by an enrichment technique.

9. A process as claimed in claim 1 wherein the methane utilising micro-organism is *Methylococcus capsulatus*.

10. A process as claimed in claim 9 wherein the temperature of operation is in the range of about 42 to about 48°C.

11. A continuous process for converting methane into proteinaceous materials which comprises cultivating a methane utilizing micro-organism continuously under steady state conditions at a minimum production rate of 0.81 grams (dry weight) of micro-organism per litre hour in an aqueous broth containing nutrient salts and ammonium ions in the presence of methane and a gas containing free oxygen, adding an aqueous nutrient medium to the broth and maintaining the broth pH in the range 4.5 to 8.0 and the ammonium ion concentration is in the range of 2 to 80 milligrams per litre.

* * * * *